(12) United States Patent  
Roche et al.

(10) Patent No.: US 8,972,352 B1  
(45) Date of Patent: **\*Mar. 3, 2015**

(54) PROBE BASED BACKUP

(75) Inventors: Michael Roche, Ontario (CA); Olga Kundzich, Ontario (CA); Lena Protasov, Sunnyvale, CA (US); Dorota Zak, Ontario (CA)

(73) Assignee: EMC Corporation, Hopkinton, MA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 13/233,920

(22) Filed: Sep. 15, 2011

Related U.S. Application Data

(63) Continuation of application No. 12/347,930, filed on Dec. 31, 2008, now abandoned.

(51) Int. Cl.  
*G06F 7/00* (2006.01)  
*G06F 17/00* (2006.01)

(52) U.S. Cl.  
USPC .................................. 707/640; 7/650; 7/665

(58) Field of Classification Search  
CPC .......................... G06F 11/1469; G06F 2201/88  
USPC ........................................................ 707/640  
See application file for complete search history.

(56) References Cited

U.S. PATENT DOCUMENTS

| | | | |
|---|---|---|---|
| 5,566,339 A | 10/1996 | Perholtz et al. | |
| 5,778,165 A | 7/1998 | Saxon | |
| 5,953,338 A * | 9/1999 | Ma et al. ................. | 370/395.21 |
| 5,966,730 A | 10/1999 | Zulch | |
| 6,157,931 A * | 12/2000 | Cane et al. ............................. | 1/1 |
| 6,330,570 B1 * | 12/2001 | Crighton ................................ | 1/1 |
| 6,532,535 B1 | 3/2003 | Maffezzoni et al. | |
| 6,754,664 B1 | 6/2004 | Bush | |
| 7,024,390 B1 | 4/2006 | Mori et al. | |
| 7,024,529 B2 | 4/2006 | Yamada | |
| 7,225,250 B1 | 5/2007 | Harrop | |
| 7,415,585 B1 * | 8/2008 | Rossi ............................. | 711/162 |
| 7,437,523 B1 | 10/2008 | Ting et al. | |
| 7,734,951 B1 | 6/2010 | Balasubramanian et al. | |
| 7,746,771 B1 | 6/2010 | Croak et al. | |
| 7,912,934 B1 | 3/2011 | Melton et al. | |
| 2001/0008586 A1 * | 7/2001 | Sasai ................................ | 399/66 |
| 2002/0184398 A1 | 12/2002 | Orenshteyn | |
| 2004/0098423 A1 * | 5/2004 | Chigusa et al. ............... | 707/204 |
| 2005/0132257 A1 | 6/2005 | Gold et al. | |
| 2006/0059253 A1 * | 3/2006 | Goodman et al. ............ | 709/223 |
| 2006/0062249 A1 * | 3/2006 | Hall et al. ...................... | 370/468 |
| 2006/0094419 A1 | 5/2006 | Katou | |
| 2006/0198373 A1 | 9/2006 | Hasegawa et al. | |
| 2006/0253905 A1 | 11/2006 | Mansel | |
| 2007/0136541 A1 * | 6/2007 | Herz et al. .................... | 711/162 |
| 2007/0139199 A1 * | 6/2007 | Hanlon ........................ | 340/572.1 |

(Continued)

FOREIGN PATENT DOCUMENTS

WO    WO 98/49626    11/1998

*Primary Examiner* — Binh V Ho  
(74) *Attorney, Agent, or Firm* — John Gould; Theodore A. Chen; Krishnendu Gupta

(57) ABSTRACT

A method, article of manufacture, and apparatus for efficiently backing up information are disclosed. In some embodiments, this may comprise determining a probe frequency, polling, at the probe frequency, at least one probe to obtain information about a computer system, and backing up data based on the information. In some embodiments, determining the probe frequency includes receiving a user-defined interval.

14 Claims, 6 Drawing Sheets

(56) References Cited

U.S. PATENT DOCUMENTS

| | | |
|---|---|---|
| 2007/0143851 A1 | 6/2007 | Nicodemus et al. |
| 2007/0192378 A1 | 8/2007 | Atchison |
| 2007/0198609 A1 | 8/2007 | Black et al. |
| 2008/0046483 A1 | 2/2008 | Lehr et al. |
| 2008/0052326 A1* | 2/2008 | Evanchik et al. ............ 707/204 |
| 2008/0154979 A1* | 6/2008 | Saitoh et al. ................. 707/202 |
| 2008/0250085 A1* | 10/2008 | Gray et al. .................... 707/204 |
| 2008/0263103 A1 | 10/2008 | McGregor et al. |
| 2009/0019492 A1 | 1/2009 | Grasset |
| 2009/0063193 A1 | 3/2009 | Barton et al. |
| 2009/0220088 A1 | 9/2009 | Lu et al. |
| 2009/0240698 A1 | 9/2009 | Shukla et al. |
| 2009/0248755 A1 | 10/2009 | Watanabe et al. |
| 2009/0299650 A1* | 12/2009 | Nelson et al. .................... 702/20 |
| 2009/0327362 A1* | 12/2009 | Shah et al. ..................... 707/204 |
| 2009/0328119 A1 | 12/2009 | Kan et al. |
| 2010/0121820 A1 | 5/2010 | Thapa |
| 2010/0131946 A1 | 5/2010 | Degaonkar et al. |
| 2012/0304299 A1* | 11/2012 | Kelekar ......................... 726/25 |

\* cited by examiner

PROBE BASED BACKUP

CROSS-REFERENCE TO RELATED APPLICATIONS

This application is a continuation of co-pending U.S. patent application Ser. No. 12/347,930 for PROBE BASED BACKUP filed Dec. 31, 2008, which is incorporated herein for all purposes. This application is related to related to co-pending U.S. patent application Ser. No. 12/347,933 for MULTI-FACTOR PROBE TRIGGERS filed Dec. 31, 2008, which is incorporated herein by reference for all purposes; co-pending U.S. patent application Ser. No. 12/347,936 for PROBE BASED GROUP SELECTION filed Dec. 31, 2008, which is incorporated herein by reference for all purposes; and co-pending U.S. patent application Ser. No. 12/347,939 for MODULAR PROBE BACKUP filed Dec. 31, 2008, which is incorporated herein by reference for all purposes.

FIELD OF THE INVENTION

The present invention relates generally to information backup systems, and more particularly, to systems and methods of efficiently backing up information.

BACKGROUND OF THE INVENTION

Backup applications take in data from sources and store copies of the data in different locations. Backing up data is important because it enables users of data to access data in the event an original copy of data is lost or destroyed.

Typically, backing up data is automated based on time. Backup applications perform a defined number of backups during a defined time interval. For example, a backup application may perform a backup once every week.

Though automated backups based on time may provide some efficiency in backing up data, such backups do not consider to what extent data has changed during a defined time interval.

There is a need, therefore, for an improved method, article of manufacture, and apparatus for backing up information.

BRIEF DESCRIPTION OF THE DRAWINGS

The he present invention will be readily understood by the following detailed description in conjunction with the accompanying drawings, wherein like reference numerals designate like structural elements, and in which.

DETAILED DESCRIPTION

Figure 1:
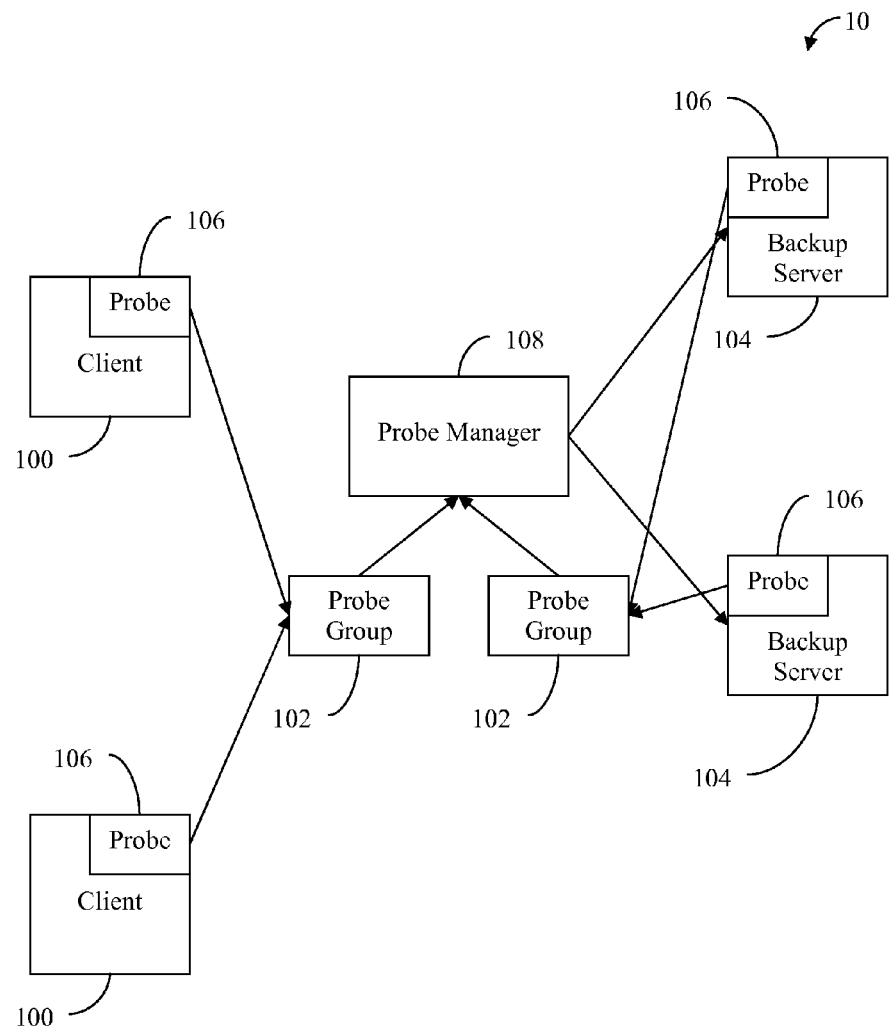
FIG. 1 is a diagram of an embodiment of a backup system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a backup system in the form of a storage system configured to store files, but it should be understood that the principles of the invention are not limited to data storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Disclosed herein are a method and system to efficiently backup information. Generally, backups are performed automatically based on defined time intervals. However, such backups do not take into account to what extent data has changed since a previous backup. For example, if a backup application was set to perform a backup of a source (client) every week, but there was no change in the client for a week, two consecutive backups would have identical information. This lowers the efficiency and usefulness of a backup system. Not only would a backup system have to transmit twice as much data as necessary, but a backup system may also unnecessarily create client downtime. Furthermore, in backup systems which store a set number of backup points, having two backup points which are identical or very similar reduces the usefulness of having multiple backup points.

The present invention allows for backup systems to automatically perform backups based on user-defined conditions. In some embodiments, user-defined conditions may include state of a backup server, network traffic, level of activity which has occurred on a client since previous backup, etc. By backing up data based on user-defined conditions, problems of time-only based backups are alleviated, and greater efficiency is achieved.

FIG. 1 illustrates an embodiment of the current invention. A backup system 10 comprises clients 100, probe groups 102, backup servers 104, probes 106, and probe manager 108. Clients 100 are the sources of backup data, and may be transitory or non-transitory. Transitory clients are clients in which data is moving, such as network traffic. Non-transitory clients are clients in which data is not moving, such as a disk drive or CD-ROM. Backup servers 104 are servers which perform backups of Clients 100. It should be understood that although an embodiment is being described as being used with disk drives, any type of storage may be used, such as tape drives, content addressable storage, flash memory, optical drives, CD-Recordable drives, DVD-Recordable drives, non-volatile storage, etc.

Probes are used to detect changes in their respective host. As shown by various Probes 106 in FIG. 1, Probes 106 may reside in a client or a backup server. In some embodiments, a client-based probe may review a database. For example, a script may be used to generate a log of activity taking place in a database. A probe may monitor characteristics of a log (such as size, etc.). If a monitored characteristic reaches a user-defined criteria (such as a log reaching 1 GB in size), a probe may indicate that a backup is needed or allowed to proceed. In some embodiments, a server-based probe may evaluate how much traffic is on a backup server. In some embodiments, probes may reside inside a client directory specified by a user. Furthermore, in some embodiments, multiple probes may reside in a single host.

Probes are also pluggable, meaning that a first probe may be replaced with a second probe configured to obtain information. The backup server does not have to know the details of what the probes are monitoring, and may be configured to receive only an indication of whether a condition has been met. This allows for a modular framework. In some embodiments, the second probe may be configured to obtain information different than the first probe.

Figure 2:
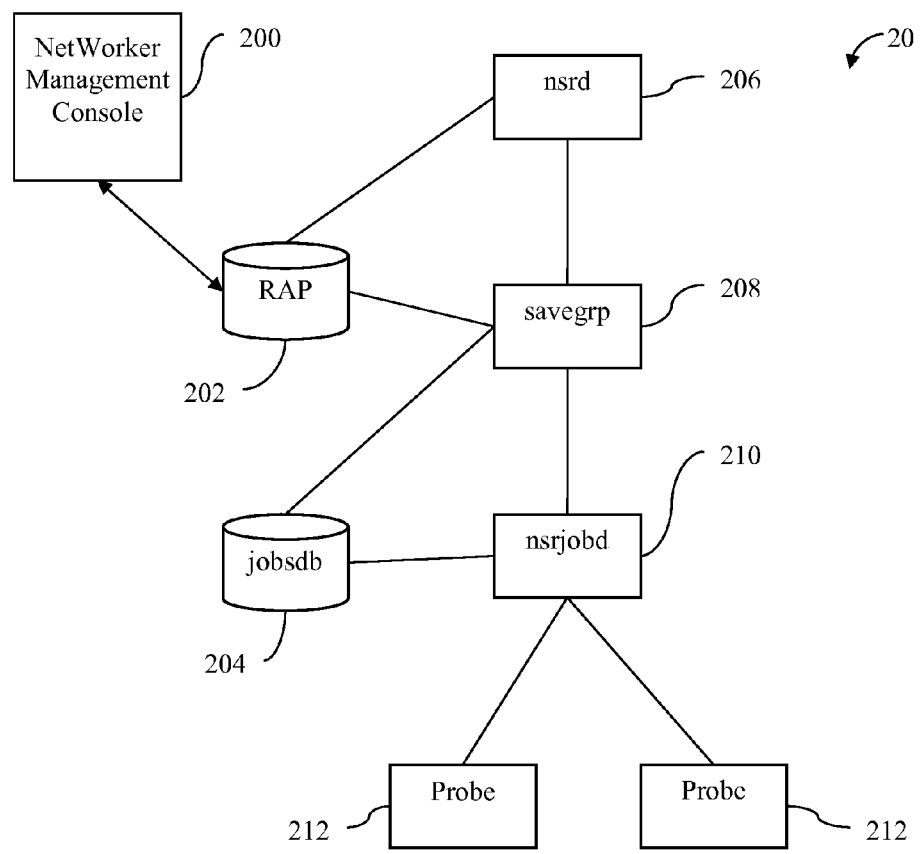
FIG. 2 is a diagram of an embodiment of a backup system in accordance with the invention.

FIG. 2 illustrates an embodiment of the current invention in NetWorker, a product developed by EMC Corporation. NetWorker system 200 comprises NetWorker Manager Console 200, Remote Access Protocol (RAP) 202, Jobsdb 204, Nsrd 206, Savegrp 208, Nsrjobd 210, and Probes 212. RAP 202 is a database which allows for NetWorker configuration information and interface with the rest of NetWorker system 200. Jobsdb 204 is a database of jobs (backup operations). Nsrd 206 is the main NetWorker server daemon. Savegrp 208 is a helper function to nsrjobd that defines time based schedules for jobs. Savegrp 208 requests execution of Probes 212, reports their results, and decides whether to proceed with the backup. Nsrjobd 210 is the daemon that controls the execution of jobs within Networker system 200, and knows which client directory Probes 212 reside in.

Probe groups 102 are used to group Probes 106 together. Probe groups are defined by the user and are very customizable. As shown in FIG. 1, in some embodiments, probe groups may be based on a probe's location. Client-based probes belong to a probe group, while server-based probes belong to a different probe group. In some embodiments, probes may be grouped together based on what they probe, not necessarily where they probe. For example, a probe group may consist of probes monitoring remaining disk space. This group would be independent of location, (e.g., a probe monitoring disk space can be in a client or a backup server).

A modular framework may be implemented using probe groups, although a modular frame work may be implemented without using probe groups. Probe groups separate probes from backup servers, so backup servers do not know what probes are doing. In some embodiments, probes send to probe groups an affirmative or a negative (e.g. proceed with a backup, or do not proceed with a backup). Probe groups may then send an affirmative or a negative to a probe manager, which in turn may send an affirmative or negative to a backup server.

Figure 4:
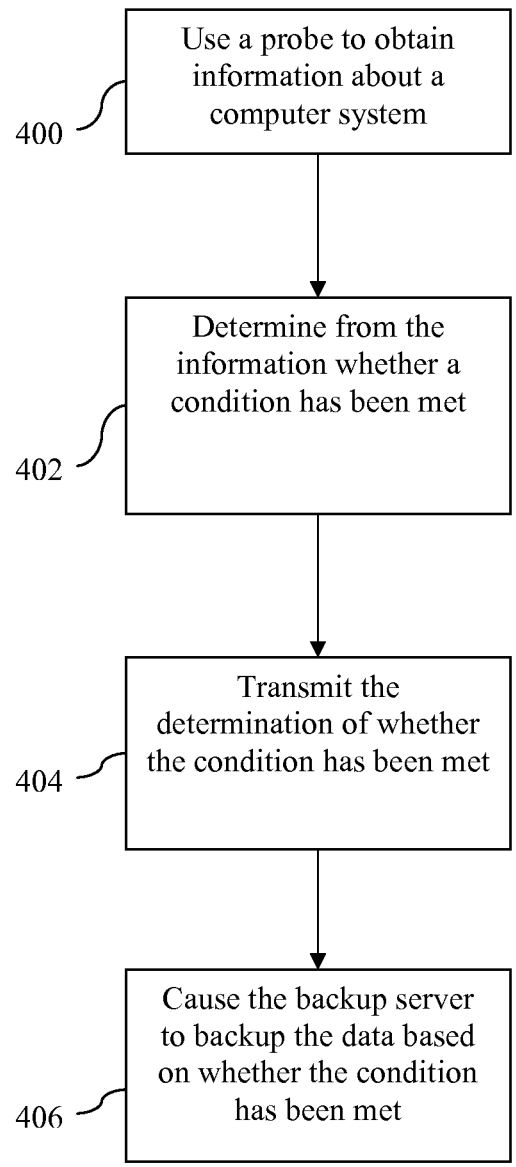
FIG. 4 is a flowchart of a method to backup information in accordance with the invention.

FIG. 4 illustrates a flowchart illustrating one embodiment of the present invention utilizing a modular framework. In step 400, a probe is used to obtain information about a computer system. In step 402, information obtained from the probe is used to determine whether a condition has been met. In step 404, the determination of whether the condition has been met is transmitted to a backup server. In step 406, the backup server is caused to backup data based on whether the condition has been met.

Probe manager 108 receives the results from Probe groups 102. In some embodiments, depending on a user's preferences, Probe manager 108 will instruct Backup servers 104 to perform a backup of Clients 100. In some embodiments, a user may require that a backup be performed only if there has been sufficient activity on clients since the most recent backup, and if the network is not too busy. Following the above example, if three out of five client-based probes detected a requisite level of activity, its probe group would report an affirmative signal to a probe manager to perform a backup. However, if there was another probe group consisting of server-based probes, and server based probes did not detect a requisite level of bandwidth available on backup servers, its probe group would report a negative signal to a probe manager. In this example, a user required an affirmative signal from both probe groups, so a probe manager would not inform backup servers to perform a backup.

As illustrated above, probe managers and probe groups allow for great flexibility in backup systems. The above example used only one layer of logic, involving only a logical function "AND." However, users are not limited to one layer or one logical function. Users may apply a wide variety of logic, including use of logical functions "AND," "OR," "NOT," Boolean operations, "IF," "THEN," "ELSE," "WHILE" etc. Depending on a user's needs, the level of logic required to determine when to perform a backup may be quite sophisticated.

Figures 3A, 3B:
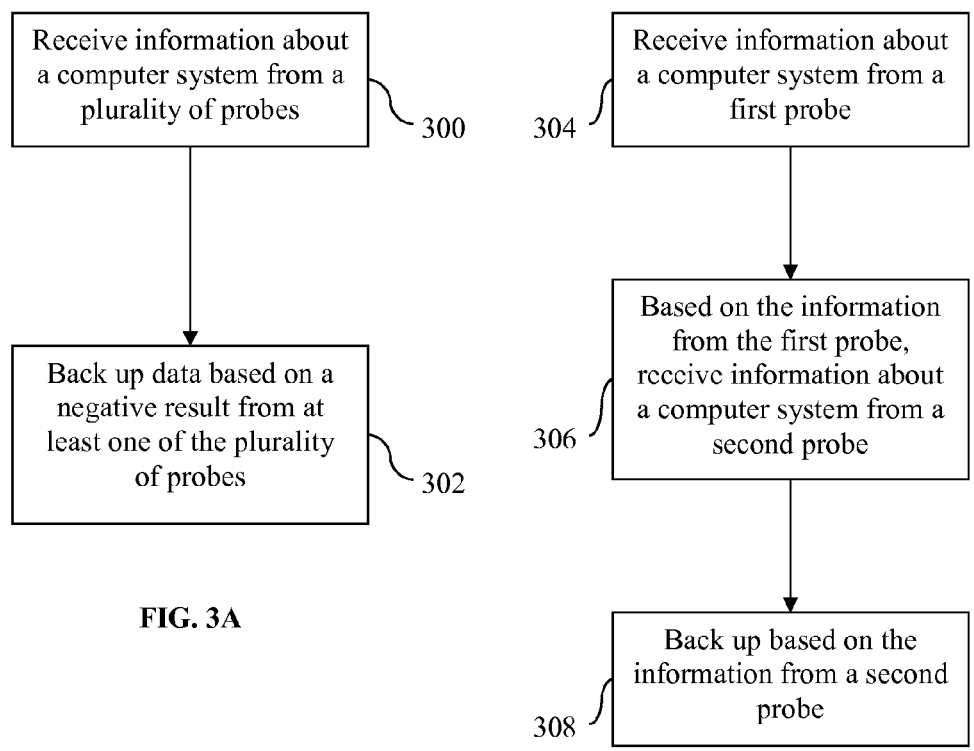
FIG. 3 is a flowchart of a method to backup information in accordance with the invention.

FIG. 3A illustrates a flowchart for backing up information in one embodiment of the invention. In step 300, information about a computer system is received from a plurality of probes. In step 302, data is backed up based on a negative result from at least one of the plurality of probes.

FIG. 3B illustrates a flowchart for backing up information in one embodiment of the invention. In step 304, information about a computer system is received from a first probe. In step 306, based on the information from the first probe, information about a computer system is received from a second probe. In step 308, data is backed up based on the information from the second probe.

It should be understood that one need not follow the examples given above. In some embodiments, probes may send more detailed information to a probe group. Such detailed information may include the date and time which a database was modified, the importance of data (e.g. an important accounting excel sheet compared to an outdated marketing document), etc. Probe groups may use information obtained from probes to perform its own analysis to whether or not a backup should proceed. In some embodiments, probe groups may not analyze information obtained from probes and instead pass it directly to a probe manager. The process for determining whether a condition has been met may be done on a backup server, on a client being probed, or on a different client. The level of customization may be quite high. Furthermore, information obtained from probes may be used to select what kind of data to backup. For example, if a probe detected that a hard disk may be in danger of failing, a backup server may backup critical data on the hard disk.

Figure 5:
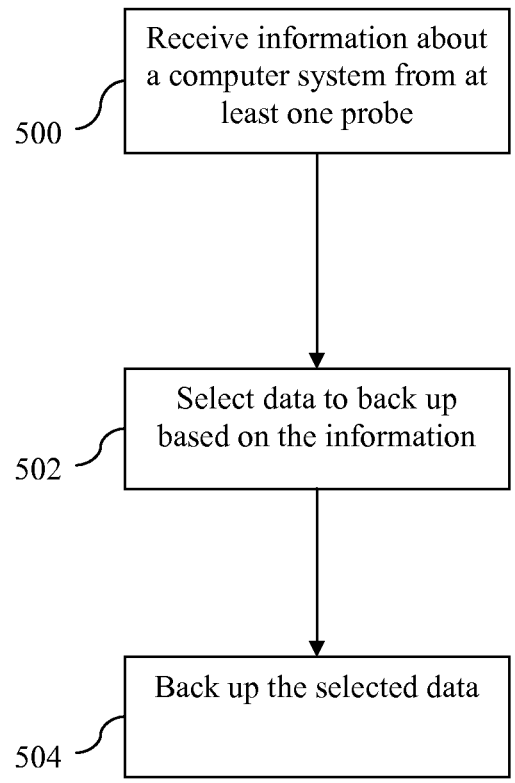
FIG. 5 is a flowchart of a method to backup information in accordance with the invention.

FIG. 5 is a flowchart illustrating a method for backing up data in one embodiment of the present invention. In step 500, information about a computer system is received from at least one probe. In step 502, data is selected based on the information. In step 504, the selected data is backed up.

Furthermore, in some embodiments, it may be preferable to have probes report directly to probe managers, and not utilize probe groups. This may be the case in which there are a small number of probes. Similarly, it may be preferable to have probe groups report directly to a backup server, without utilizing a probe manager.

In some embodiments, probe groups are used to decide whether a user-defined condition has been met. For example, in a system with five clients and their respective probes, a user may set that a condition will be met if three out of five client probes detects that there has been a sufficient amount of data activity. In some embodiments, all of the probes in a probe group must detect a condition before a backup will be performed. In some embodiments, some of the probes in a probe group must detect a condition before a backup will be performed. In some embodiments, only one probe needs to detect a condition before a backup will be performed. In some embodiments, conditions must be detected by some probes and other conditions must not be detected by other probes before a backup will be performed. Users may decide how many probes need to detect a condition before a backup will be performed.

Backup systems may consist of many clients and servers, so it may not be feasible for probes to constantly report back to probe groups or probe managers. In some embodiments, it may be preferable that probes report during set time intervals, such as when polled by backup systems, and the frequency of polling may be referred to as probe frequency. For example, a user may program probes to wake up, monitor conditions (e.g. client activity, network traffic, etc.) for thirty minutes, and then sleep for an hour before a next wake-up. In some embodiments, users may define a start time and an end time for probes to poll their host.

In some embodiments, users may define a time interval or probe frequency. In some embodiments, a backup system can use previous probe results to determine the length of the next time interval. For example, if a probe returned a negative signal (e.g. do not backup) ten times consecutively, a backup system may "learn" that the probe does may not need to be probing as often and may increase the probe's time interval or lower the probe's probe frequency. Similarly, if a probe returned a positive signal (e.g. do perform a backup) ten times consecutively, a backup system may learn that the probe may need to be probing more often and decrease the probe's time interval or increase the probe's probe frequency.

Furthermore, in some embodiments, a probe interval may be adjusted according to information obtained from another probe. For example, if a first probe obtained information that a backup server was overloaded (e.g. did not have any bandwidth to perform additional functions), a backup system could increase other probes' time intervals so that the load on a backup server would be reduced. In some embodiments, modifying probes' time intervals may be universal (e.g. all probes' time intervals may be increased 20%). In some embodiments, modifying probes' time intervals may be variable (e.g. time intervals of probes monitoring legal documents may be unchanged, while time intervals of probes monitoring CPU usage may be increased). This may be the case where different data classifications or priorities exist. For example, legal documents are in a classification that is different than marketing documents. Recent financial statements may have a higher priority than ten year old financial statements.

Figure 6:
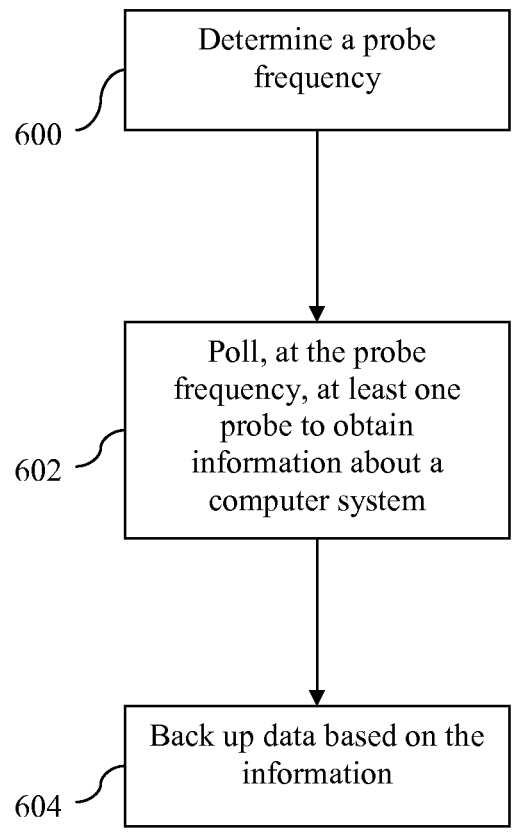
FIG. 6 is a flowchart of a method to backup information in accordance with the invention.

FIG. 6 illustrates a method to backup data in one embodiment of the present invention. The first step, step 600, is to determine a probe frequency. In step 602, polling of probes at the probe frequency is done to obtain information about a computer system. In step 604, data is backed up based on the information.

A backup system may also use relationships between databases to determine time interval adjustments. For example, if a backup system reduced a time interval of a probe monitoring accounting records, a backup system may accordingly reduce a time interval of a probe monitoring financial records since both types of records have a close correlation (e.g. if accounting records change, financial records are very likely to change).

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

Though the above has been described with reference to the term "backup" for illustrative purposes, the present invention is equally applicable to all forms of data duplication. These forms of data duplication include replication and archiving, among others.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for backing up data, comprising:
providing a probe, the probe detecting changes in a host;
receiving information about a load of a backup server;
determining a probe frequency, wherein the probe frequency defines how often the probe should be polled, wherein determining the probe frequency includes adjusting the probe frequency based on the load of the backup server;
waking the probe at the probe frequency;
polling the probe to obtain information about the host for a time interval, wherein the probe sleeps for the probe frequency after the time interval;
adjusting the probe frequency based on information obtained by polling the at least one probe wherein adjusting the probe frequency includes reducing the probe frequency based on a negative result from polling the at least one probe and applying a scaling factor to reduce the probe frequency to reduce utilization of the backup system; and
backing up data based on the information.

2. The method as recited in claim 1, wherein determining the probe frequency includes receiving a user-defined interval.

3. The method as recited in claim 1, wherein determining the probe frequency includes selecting the probe frequency based on information obtained by polling the at least one probe.

4. The method as recited in claim 1, wherein determining the probe frequency includes selecting the probe frequency based on a priority of the data.

5. The method as recited in claim 1, wherein determining the probe frequency includes selecting the probe frequency based on a classification of the data.

6. The method as recited in claim 1, wherein adjusting the probe frequency includes increasing the probe frequency based on a positive result from polling the at least one probe.

7. The method as recited in claim 1, further comprising receiving information about network utilization, and wherein determining the probe frequency includes adjusting the probe frequency based on the network utilization.

8. The method as recited in claim 7, wherein adjusting the probe frequencies includes increasing probe frequency if the information obtained by polling indicates a positive result, and reducing probe frequency if the information obtained by polling indicates a negative result.

9. The method as recited in claim 1, further comprising determining a second probe frequency, and polling a second probe at the second probe frequency.

10. The method as recited in claim 9, further comprising adjusting the probe frequencies based on information obtained by polling respective probes, and polling the respective probes at the adjusted probe frequencies.

11. The method as recited in claim 1, wherein polling the at least one probe includes polling a first probe group at the probe frequency.

12. The method as recited in claim 11, further comprising determining a second probe frequency, and polling a second probe group at the second probe frequency.

13. A system for backing up data from a client computer system having at least one associated probe, comprising a processor configured to:
provide a probe, the probe detecting changes in a host;
receive information about a load of a backup server;
determine a probe frequency, wherein the probe frequency defines how often the probe should be polled, wherein determining the probe frequency includes adjusting the probe frequency based on the load of the backup server;
wake the probe at the probe frequency;
poll the probe to obtain information about the host for a time interval, wherein the probe sleeps for the probe frequency after the time interval;
adjust the probe frequency based on information obtained by polling the at least one probe wherein adjusting the probe frequency includes reducing the probe frequency based on a negative result from polling the at least one probe and applying a scaling factor to reduce the probe frequency to reduce utilization of the backup system; and
back up data based on the information.

14. A computer program product for backing up data, comprising a non-transitory computer readable medium having program instructions embodied therein for:
providing a probe, the probe detecting changes in a host;
receiving information about a load of a backup server;
determining a probe frequency, wherein the probe frequency defines how often the probe should be polled, wherein determining the probe frequency includes adjusting the probe frequency based on the load of the backup server;
waking the probe at the probe frequency;
polling the probe to obtain information about the host for a time interval, wherein the probe sleeps for the probe frequency after the time interval;
adjusting the probe frequency based on information obtained by polling the at least one probe wherein adjusting the probe frequency includes reducing the probe frequency based on a negative result from polling the at least one probe and applying a scaling factor to reduce the probe frequency to reduce utilization of the backup system; and
backing up data based on the information.

* * * * *